United States Patent [19]

Mortenson

[11] Patent Number: 4,913,181

[45] Date of Patent: Apr. 3, 1990

[54] PRIORITY VALVE AND METHOD FOR USING SAME

[75] Inventor: Jerome A. Mortenson, Rockford, Ill.

[73] Assignee: Sundstrand Corporation, Rockford, Ill.

[21] Appl. No.: 165,708

[22] Filed: Mar. 8, 1988

[51] Int. Cl.⁴ ............................................. G05D 11/02
[52] U.S. Cl. ..................................... 137/12; 60/413; 60/422; 137/118
[58] Field of Search .................. 60/413, 422; 137/12, 137/118; 165/38

[56] References Cited

U.S. PATENT DOCUMENTS

| | | | |
|---|---|---|---|
| 3,543,516 | 5/1969 | Treichel . | |
| 3,733,924 | 5/1973 | Zentz | 74/687 |
| 4,014,360 | 3/1977 | Adams | 137/118 |
| 4,087,968 | 5/1978 | Bianchetta . | |
| 4,192,337 | 3/1980 | Alderson et al. | 60/413 X |
| 4,270,562 | 6/1981 | Oberth | 137/118 X |
| 4,479,349 | 10/1984 | Westveer . | |
| 4,556,078 | 12/1985 | Wittren . | |
| 4,665,939 | 5/1987 | Kreth et al. . | |

Primary Examiner—Robert G. Nilson
Attorney, Agent, or Firm—Antonelli, Terry & Wands

[57] ABSTRACT

A priority valve (10) useful in, for example, an aircraft constant speed drive system controls sump oil level and prioritizes oil flow to several critical components during periods of oil supply interruption. The priority valve (10) includes a movable spool (17) which has a reduced portion (19) surrounded by a spring (18) to urge the spool (17) toward a closing position in which oil is supplied directly from an accumulator (80) to a deaerator (20). The spool (17) is caused to move against the bias of the spring (18) by output oil pressure of the deaerator (20) which is input into the valve (10). The member (17) has an axial passageway (101) with branch radial passageways (103, 104, 105, and 106) for selectively prioritizing the flow of oil to critical system components such as a generator rotor (52), a generator stator (53), and a hydraulic case (90) so that whatever oil is available in the system is made available to the most critical system components.

15 Claims, 2 Drawing Sheets

PRIORITY VALVE AND METHOD FOR USING SAME

TECHNICAL FIELD

The present invention relates to a priority valve and a method of using same in, for example, an aircraft installation. More particularly, the present invention is directed to a priority valve of the type which controls oil level in an integrated drive generator (IDG) sump while ordering oil flow in priority to various components in a constant speed drive (CSD) system to ensure that several critical components will receive, in sequence, oil for lubrication and cooling even during an interruption in oil supply.

BACKGROUND ART

A CSD system of the general type referred to herein for use in aircraft installation is shown in U.S. Pat. No. 3,733,924. The system disclosed therein employs a mechanical differential in conjunction with a hydrostatic transmission to rotate an aircraft alternator at constant speed via power supplied from a variable speed aircraft engine. The hydrostatic transmission is associated with a closed hydraulic circuit. Fluid is supplied to the circuit through a charge pump from a sump. Fluid pressure is regulated by a charge relief valve. An external circuit is provided for the IDG. This system does not include a valve which prioritizes the flow of oil to critical components during interruption of oil supply and which, at the same time, controls oil level in the sump.

Another aircraft CSD system is shown in U.S. Pat. No. 3,600,106. This system aims at reducing the required component weight in aircraft by providing a sump pressurization approach which eliminates the need for external engine bleed hardware. This aim is achieved by supplying air-entrained liquid into the transmission sump to attain a sufficient inlet head for the scavenge pump to maintain a desired efficiency level. A relief valve maintains a preset charge pressure in the fluid circuit. A differential pressure valve is used to maintain a sufficient pressure within a transmission sump so that there is sufficient pressure head at the inlet of a scavenge pump used for drawing leaking fluid from the transmission sump and delivering that fluid to the return conduit.

A charge pump is utilized to provide makeup, lubricating and control fluid for the system. The charge or makeup fluid is fed through a conduit connected to a port in a hydraulic drive to make up for loss of fluid caused by leakage. Excess charge fluid flows over a charge relief valve which maintains a preset charge pressure in the conduit. A sump is provided in the case of the CSD to collect leakage fluid which is then pumped by means of a scavenge pump to a return conduit which passes through an external cooling circuit, i.e. the cooler is located outside the case or housing of the CSD system, and then to a reservoir where air entrained in the fluid is separated before the fluid is returned to the charge pump. However, no provision is made in this system for controlling oil sump level by diverting excess oil to an accumulator tank or setting priorities of oil supply between a number of functions sequentially.

Valves with movable spools have long been known for a variety of uses. For example, U.S. Pat. No. 4,537,284 discloses a progressive distributor valve for distributing lubricant to heddles of weaving machines. However, this valve is not designed for the purpose of controlling sump level or prioritizing flow to critical components.

Priority valves with movable spools in general are also known. Typically, these valves are designed to prioritize a function over other functions where there is an increased demand for fluid by the priority function. Conventional priority valves have not heretofore been used also as a device to control oil sump level. For instance, U.S. Pat. No. 4,556,078 shows a priority valve designed to control fluid flow between a power source and a hydraulic function in applications such as steering of agricultural and industrial off-road equipment. Pressurized fluid is supplied to one or more priority functions such as steering and to one or more non-priority functions such as hitches. However, the priority valve teaches prioritization of only one function and does not disclose how more than one function would be prioritized and in what order or sequence. Nor does it control sump oil level. This known priority valve operates by responding to an increased flow demand for providing a priority. It does not provide a mechanism for prioritization where an interruption in oil supply creates a drop in inlet pressure yet a need to supply oil to critical components for lubrication and cooling.

Another priority control for hydraulic steering is described in U.S. Pat. No. 4,665,939. Here, the pressure medium is divided between a priority "consumer" and a lower-ranking "consumer" via a priority valve in the form of a proportional valve. The flow of fluid to the consumers is regulated by pressure balance valves. If the priority consumer receives too little fluid, the proportional valve will act to throttle flow to the lower-ranking consumer. Again, it will be seen that this control prioritizes only one flow and does not control oil sump level. Moreover, priority of flow is related to a pressure decrease to the higher priority device.

U.S. Pat. No. 4,192,337 discloses another embodiment of a priority flow valve which operates in response to increased fluid demand by the single primary function, again typically a steering function. This system uses a valve with an additional land and port for conditional connection to an accumulator so that power stored in the accumulator can where desired be provided to the priority function.

The system described in U.S. Pat. No. 4,087,968 utilizes a solenoid-operated flow control valve and a pump in which displacement is varied to ensure that flow demand of the first work element and the plurality of second work elements is maintained. This flow control valve is not a priority valve since the flows are not prioritized between the first and second work elements.

The automatically shiftable direction control valve of U.S. Pat. No. 3,543,516 for a tractor hydraulic system which automatically directs the exhaust of continuously acting or double acting functions to a charging circuit so that there is always sufficient oil in the charging circuit to operate a priority function such as a system for supplying oil to cool and lubricate a tractor engine and transmission. The priority function is connected to the charging circuit which connects a charging pump output with a main pump input. If there is an increased flow demand, oil is recirculated through the main pump and bypasses the charging pump which is then free to supply oil only to the single primary function as opposed to the other functions.

Another conventional single priority function valve control system is described in U.S. Pat. No. 4,479,349. The distribution of fluid from a variable displacement pump to several different fluid-actuated devices is regulated by the control system. The priority valve gives fluid flow priority to the steering valve over the loader valve or the stabilizer valve of a combination backhoe and loader vehicle to ensure that increased flow demand in the steering valve will be given priority.

From the foregoing summary of typical priority valves of conventional construction and use, it can be seen that systems utilizing these valves have not been capable of prioritizing more than one function without depriving another function of fluid and are not designed to actuate the priority valve in response to pressure loss. Moreover, I am unaware that any conventional priority valve has heretofore been used to control sump oil level.

DISCLOSURE OF THE INVENTION

It is an object of my invention to provide a priority valve which is capable of assigning several levels of priorities for several devices or functions and, at the same time, controlling sump oil level.

It is another objective of my invention to utilize a priority valve in a system wherein pressure of fluid from a deaerator is used to indicate the volume of fluid in the overall system.

It is yet another object of my invention to allow the priority valve to determine the priority of fluid supply based upon the pressure of available fluid.

The objects are achieved through the provision of a priority valve with a movable spool installed in, for example, a CSD system which includes an IDG sump, a scavenge pump, a deaerator, a generator rotor, case and accumulator. In such a system, the priority valve according to my invention can advantageously control the sump oil level while sequencing prioritization based upon the pressure of the oil from the deaerator which is taken as the volume of oil in the entire system.

My priority valve has the advantage of providing priority sequencing of several functions by virtue of a relatively simple movable spool which communicates lines in a predetermined priority sequence both in response to increased and decreased flow demand.

BRIEF DESCRIPTION OF THE DRAWINGS

These and further objects, features and advantages of my invention will become more apparent from the following detailed description of a presently preferred embodiment when taken in conjunction with the accompanying drawing which illustrates that embodiment in an exemplary fashion and wherein.

BEST MODE

For ease of understanding of my invention and in the interests of clarity and conciseness, I have illustrated my priority valve in a CSD system with an IDG hydraulic circuit in only general terms since these systems are conventional. It is not necessary to an understanding of my invention to discuss the CSD system in detail.

Figure 1:
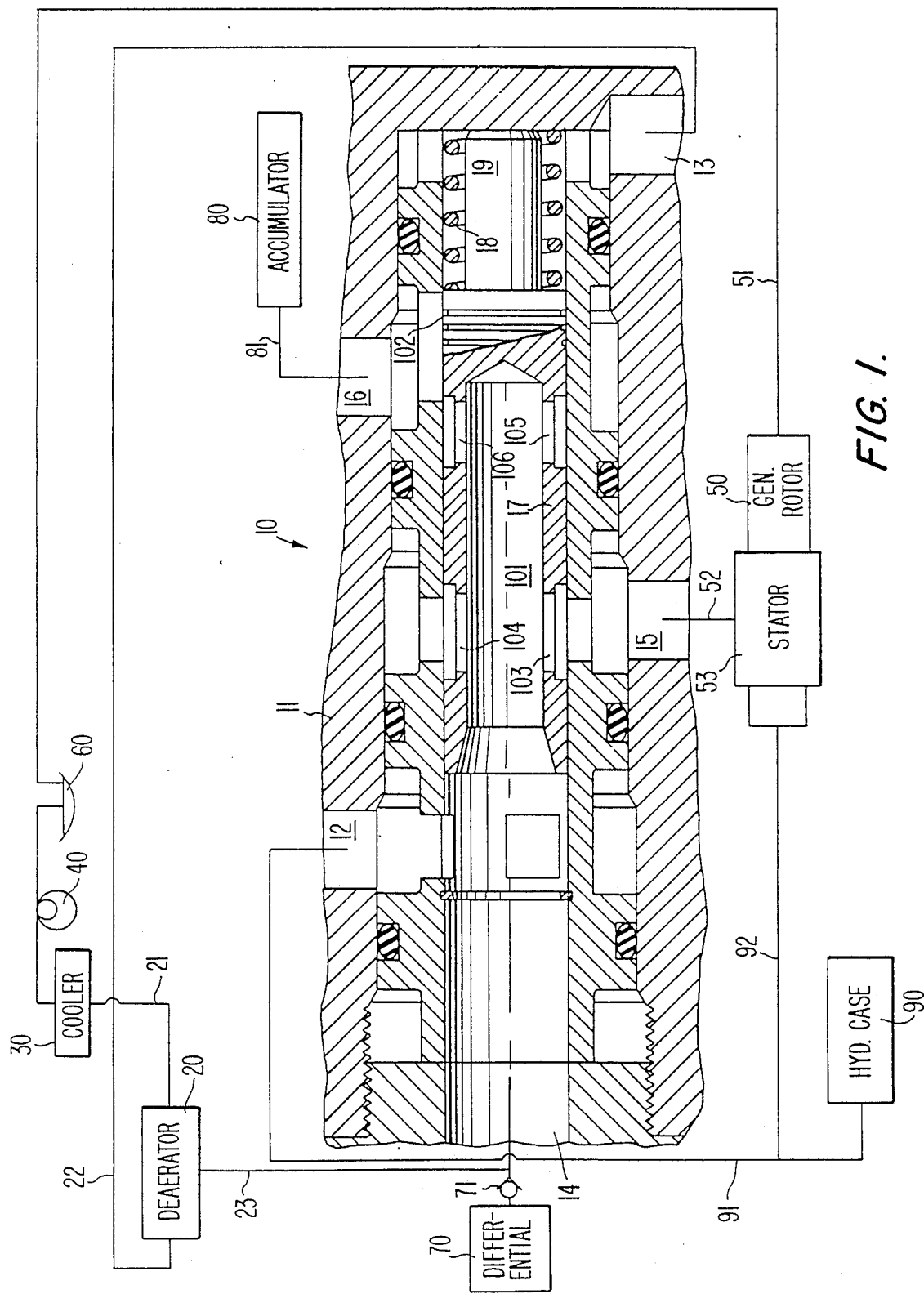
FIG. 1 is a general overall view of the priority valve in relation to a CSD system with only the most important system parts of known type shown schematically and wherein the priority valve and movable spool are shown in section positioned rightwardly by deaerator output pressure.

A presently preferred embodiment of my novel priority valve is designated generally by the numeral 10 in FIG. 1. The valve 10 has a casing 11 which is suitably affixed in relation to the CSD system whose principal parts of interest here comprise a deaerator 20 for separating gas by centrifugal action from the fluid such as lubricating and cooling circulating in the system, a cooler 30 for cooling oil which has been heated during circulation through the system, a scavenge pump 40 for pumping fluid returned from the various IDG components to an IDG sump 60. FIG. 1 also shows a differential 70, an accumulator 80, and a hydraulic case 90 as part of the CSD system which is useful in, for example, an aircraft installation.

Various conduits connect the aforementioned devices in a predetermined fluid communication. A conduit 91 connects the input of the hydraulic case 90 with a port 12 in the priority valve case 11. A branch conduit 92 from conduit 91 also connects to an input of the generator rotor 50, while a conduit 51 connects the output of the generator rotor 50 to the IDG sump 60. Another conduit 52 connects an input of the generator stator 53 to an output port 15 of the priority valve casing 11.

The sump 60, scavenge pump 40 and cooler 30 are all in series communication with the input of the deaerator 20 through conduit 21, whereas a conduit 22 connects an inversion inlet of the deaerator 20 with a port 13 in the priority valve casing 11. The inversion inlet is of a known type and is used in, for example, aircraft installation in negative −g conditions to prevent interruption to flow. Here, the inversion inlet allows oil dumped out of the accumulator to return back to the case. A conduit 23 connects the output of the deaerator 20 to an input port 14 in the priority valve casing 11. The differential 70 is also in fluid communication with the deaerator output conduit 23 through check valve 71. A conduit 81 connects an accumulator with a port 16 in the priority valve casing 11.

A member 17 is movably arranged within the priority valve casing 11. The member 17 is normally urged toward the left by a compression spring 18 which surrounds a reduced cylindrical portion 19 integrally connected at the right end of the member 17. To illustrate the construction of the valve most clearly, the main or left side of the member 17 with an axial passageway 101 is shown sectioned and a portion between the main side and reduced portion 19 is broken away to reveal balance grooves 102 which equalize pressure around the circumference of the member 17 to prevent side loading but which do not form part of my invention. The passageway 101 is provided in the illustrated embodiment with four radially extending passages 103, 104, 105 and 106. Passages 103 and 104 are axially aligned toward the left end of passageway 101, and likewise passages 105 and 106 ar aligned toward the right end of passageway 101. The passageway 101 does not extend completely through the member 17, but dead ends in advance of the reduced portion 19.

I will now describe how my priority valve controls oil level in the sump by directing excess oil volume resulting from heat expansion into the accumulator 80 and prioritizes oil flows to the generator rotor 50, stator 53 and case 90 to ensure that the most critical components will receive lubricating and cooling oil in the event of a drastic and sudden interruption in oil supply.

As shown in FIG. 1, the priority valve movable member 17 has already been moved rightwardly by pressurized oil from the deaerator 20 through conduit 23 against the bias of spring 18 after first supplying oil to the differential 70. Oil is free to flow from the sump 60 via the scavenge pump 40 and cooler 30 through the conduit 21 into the deaerator where air is centrifugally removed from the oil to the differential 70, then into the inlet port 14 of the priority valve 10, directly through the outlet port 12 which has become uncovered through conduit 91 and finally to the hydraulic case 90 and the generator rotor 50 through branch conduit 92. Oil from the generator rotor returns to the sump 60 via conduit 51. Oil from the other components is sprayed directly into the IDG case and trickles down to the sump 60.

As the level of oil in the IDG sump 60 increases, the output pressure of the deaerator 20 also increases, thereby causing the member 17 in the priority valve 10 to move further to the right. First, as shown in FIG. 1, passageway 103 will communicate with outlet port 15 permitting the flow of oil to the generator stator 53. Passageway 106 will provide a slight communication with outlet port 16 to provide a small flow of oil to the accumulator 80. Then as the deaerator output pressure increases, member 17 moves to further open the flow path to the accumulator 80. Flow will be directed to the accumulator until the level of oil in the generator drive drops off sufficiently to provide equilibrium. To the extent the oil level in the sump 60 decreases, the deaerator output pressure will also drop, and the accumulator 80 will direct oil to the sump 60 via port 16 and conduit 22.

Figure 2:
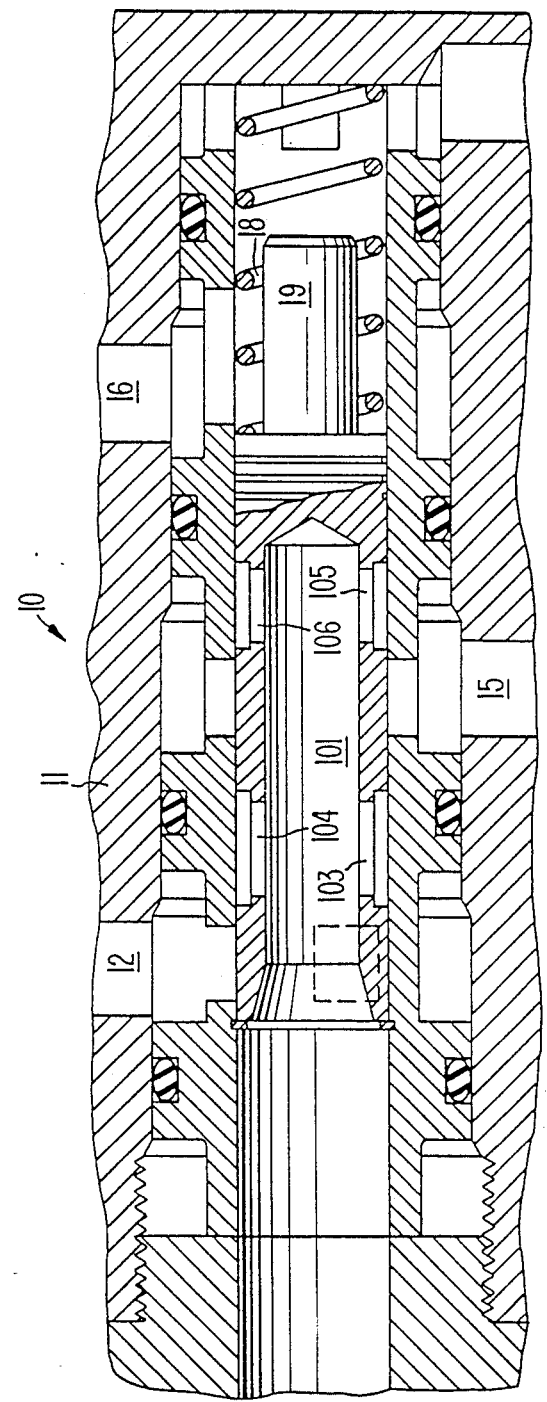
FIG. 2 is a sectional view of the priority valve of my invention wherein the valve spool has moved leftwardly due to a drastic decrease in deaerator pressure.

In the event of sudden oil interruption, a drastic reduction in deaerator output pressure will occur. The member 17 will move to the left under the bias of spring 18 to the position shown in FIG. 2. As the member 17 moves to the left, it selectively shuts off the oil supply to each port to maintain for as long as possible the cooling and lubricating oil supply to critical components in an order of priority. When the member 17 is at its leftmost position, the accumulator 80 is coupled directly to the input of the deaerator 20 to provide whatever oil is available for the critical system components. During normal operations, oil is also provided to the differential 70 through the check valve 71.

While I have shown and described a preferred embodiment in accordance with my invention, it is to be understood that the same is susceptible to changes and modifications within the ordinary skill in the art. Therefore, I do not wish to be limited to cover all such changes and modifications as are within the scope of the appended claims.

I claim:

1. A priority valve adapted to be used in connection with systems having a sump from which fluid is provided to cool and/or lubricate two or more components of the system and an accumulator in communication with the sump, comprising means for controlling fluid level in the sump and for prioritizing a plurality of flows of the fluid to the two or more components in an order of priority in the event of a substantial sudden reduction of supply of the fluid to the components wherein the fluid level controlling and prioritizing means include a casing with an inlet port communicating with the sump and outlet ports connected to respective system components and the accumulator, a member movable in said casing through the inlet port to selectively connect the outlet ports with the fluid entering the casing, and means for normally biasing the movable member toward the inlet port against the pressure of the fluid entering the inlet port.

2. A priority valve according to claim 1, wherein the movable member is provided with an axial passageway and radially extending branch passages to provide the selective connection of the outlet ports with the entering fluid as the movable member moves in relation to the biasing means.

3. A priority valve adapted to be used in connection with a system having a sump from which fluid is provided to cool and/or lubricate two or more components of the system, an accumulator in communication with the sump, a generator stator, a generator rotor and a hydraulic case, comprising means for controlling fluid level in the sump and for prioritizing a plurality of flows of the fluid to the two or more components in an order of priority in the event of a substantial sudden reduction of supply of the fluid to the components wherein the fluid level controlling and prioritizing means include a casing with an inlet port communicating with the sump and outlet ports connected to respective system components and the accumulator, a member movable in said casing in response to pressure of fluid entering the casing through the inlet port to selectively connect the outlet ports with the fluid entering the casing, and means for normally biasing the movable member toward the inlet port against the pressure of the fluid entering the inlet port.

4. A priority valve according to claim 3, wherein the outlet ports are axially spaced along the valve casing, and the outlet port most remote from the inlet port is in fluid communication with an inversion inlet of the deaerator.

5. A priority valve according to claim 4, wherein the outlet port in communication with the accumulator also communicates with the outlet port in communication with the deaerator inversion inlet at a position where the movable member has been moved to its position closest to the inlet port by the biasing means.

6. A priority valve according to claim 5, wherein the outlet port most proximate to the inlet port is in fluid communication with the hydraulic case and the generator rotor.

7. A priority valve according to claim 6, wherein another of the outlet valves is in fluid communication with the generator stator.

8. A priority valve according to claim 7, wherein the generator rotor is in fluid communication with the sump to return the fluid thereto after cooling and lubricating one or more of the system components.

9. A priority valve according to claim 8, wherein the system components include a differential.

10. A priority valve according to claim 9, wherein the means for controlling fluid level in the sump directs excess fluid into the accumulator until the amount of fluid in the system reaches a equilibrium with the fluid level in the sump.

11. A priority valve according to claim 10, wherein the fluid delivered through the inlet is first provided to the differential, then to the outlet port in fluid communication to the hydraulic case and generator stator and then to the generator rotor.

12. A priority valve according to claim 10, wherein the fluid delivered through the inlet is increasingly provided to the outlet port communicating with the accumulator as the fluid is first supplied to the hydraulic case and generator stator and then to the generator rotor.

13. A priority valve according to claim 12, wherein upon interruption of fluid supply to the inlet, the prioritizing means is operative to communicate the fluid in the accumulator with a deaerator inversion inlet and to selectively shut off the outlet ports to the generator stator, the hydraulic case and the generator rotor in an order of priority.

14. A method for prioritizing fluid flow to components in a system and controlling the fluid level in a sump for the fluid incorporated in the system comprising the steps of:

providing pressurized fluid from the sump to an inlet of a priority valve;

sequentially communicating the pressurized fluid to the components through the priority valve and then to an accumulator to control the flow level in the sump; and sequentially shutting off the fluid at the components in an order of priority in response to an interruption of pressurized fluid at the inlet, wherein the system includes a differential, a generator rotor, a generator stator, and a hydraulic case; and the step of sequentially communicating includes first supplying fluid to the differential, then to the hydraulic case and generator rotor, and then to the generator stator.

15. A method for prioritizing fluid flow to components is a system which includes as components a generator rotor, a generator stator and a hydraulic case and controlling the fluid level in a sump for the fluid incorporated in the system comprising the steps of:

providing pressurized fluid from the sump to an inlet of a priority valve;

sequentially communicating the pressurized fluid to the components through the priority valve and then to an accumulator to control the flow level in the sump; and sequentially shutting off the fluid at the components in an order of priority in response to an interruption of pressurized fluid at the inlet, wherein the step of sequentially shutting off the fluid includes first shutting off the fluid at the generator stator and then at said generator rotor and hydraulic case.

* * * * *